US007885456B2

(12) United States Patent  
Shi et al.

(10) Patent No.: US 7,885,456 B2
(45) Date of Patent: Feb. 8, 2011

(54) SYMBOL GRAPH GENERATION IN HANDWRITTEN MATHEMATICAL EXPRESSION RECOGNITION

(75) Inventors: Yu Shi, Beijing (CN); Frank Kao-Ping Soong, Beijing (CN); Jian-Iai Zhou, Beijing (CN); Dongmei Zhang, legal representative, Beijing (CN)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 11/693,299

(22) Filed: Mar. 29, 2007

(65) Prior Publication Data

US 2008/0240570 A1 Oct. 2, 2008

(51) Int. Cl.
*G06K 9/00* (2006.01)
(52) U.S. Cl. .................. 382/161; 382/179; 382/186; 382/200; 382/228
(58) Field of Classification Search .................. 382/186
See application file for complete search history.

(56) References Cited

U.S. PATENT DOCUMENTS

| 5,454,046 | A | 9/1995 | Carman et al. .............. 382/186 |
| 5,481,626 | A | 1/1996 | Matsubayashi ............. 382/189 |
| 7,181,068 | B2* | 2/2007 | Suzuki et al. ............... 382/229 |
| 2004/0015342 | A1 | 1/2004 | Garst ........................... 704/5 |
| 2004/0054701 | A1 | 3/2004 | Garst .......................... 708/131 |
| 2006/0001667 | A1 | 1/2006 | LaViola ....................... 345/473 |
| 2006/0062471 | A1* | 3/2006 | Xu et al. ..................... 382/186 |
| 2006/0280370 | A1 | 12/2006 | Viola .......................... 382/229 |

OTHER PUBLICATIONS

Yamamoto et al., "On-Line Recognition of Handwritten Mathematical Expressions Based on Stroke-Based Stochastic Context-Free Grammar," Proceedings of the Tenth International Workshop on Frontiers in Handwriting Recognition, Oct. 2006.
Koschinski et al., "Segmentation and Recognition of Symbols Within Handwritten Mathematical Expressions," 1995 Int. Conference on Acoustics, Speech, and Signal Processing (ICASSP-95), Detroit, USA, vol. 4, pp. 2439-2442, May 1995.
Zanibbi at al., "Baseline Structure Analysis of Handwritten Mathematics Notation," Document Analysis and Recognition, 2001, Proceedings, Sixth International Conference.
Tapia et al., "Recognition of On-Line Handwritten Mathematical Expressions in the E-Chalk System—An Extension," Proceedings of the 2005 Eight Int'l Conference on Document Analysis and Recognition, 2005.
Garain at al., "Recognition of Online Handwritten Mathematical Expressions," IEEE Transactions on Systems, Man, and Cybernetics—Part B: Cybernetics, vol. 34, No. 6, Dec. 2004.

* cited by examiner

*Primary Examiner*—Brian P Werner
(74) *Attorney, Agent, or Firm*—Theodore M. Magee; Westman, Champlin & Kelly, P.A.

(57) ABSTRACT

A forward pass through a sequence of strokes representing a handwritten equation is performed from the first stroke to the last stroke in the sequence. At each stroke, a path score is determined for a plurality of symbol-relation pairs that each represents a symbol and its spatial relation to a predecessor symbol. A symbol graph having nodes and links is constructed by backtracking through the strokes from the last stroke to the first stroke and assigning scores to the links based on the path scores for the symbol-relation pairs. The symbol graph is used to recognize a mathematical expression based in part on the scores for the links and the mathematical expression is stored.

16 Claims, 11 Drawing Sheets

SYMBOL GRAPH GENERATION IN HANDWRITTEN MATHEMATICAL EXPRESSION RECOGNITION

BACKGROUND

Handwriting recognition involves converting written strokes into a sequence of symbols. Recently, there has been interest in performing such recognition on handwritten mathematical expressions.

Recognition systems for handwritten mathematical expressions have utilized a multi-stage system. Initially, the input strokes representing the mathematical expression are grouped into segments based on a likelihood that they may represent a symbol. In general, a set of n-best groupings are identified from the mathematical expression. Each of these groupings is then applied to a symbol recognition sub-system that identifies likely symbols that could be represented by the strokes in each grouping. This results in a set of n-best sequences of symbols. Each of the n-best sequences of symbols are then applied to a structure analysis that analyzes the relative positioning of the symbols to each other to identify, for example, symbols that are in the numerator or denominator of a fraction, symbols that are in a matrix, and symbols that are either a subscript or a superscript of other symbols. A semantic structure analysis is then performed to identify the semantic meaning of certain symbols, including which symbols represent operands and which symbols represent variables. The result of the semantic structure analysis is a recognized mathematical expression.

The discussion above is merely provided for general background information and is not intended to be used as an aid in determining the scope of the claimed subject matter. In general, mathematical expressions are more difficult to recognize because the information contained in a mathematical expression is dependent not only on the symbols within the expression, but on their positioning relative to each other.

SUMMARY

A forward pass through a sequence of strokes representing a handwritten equation is performed from the first stroke to the last stroke in the sequence. At each stroke, a path score is determined for a plurality of symbol-relation pairs that each represents a symbol and its spatial relation to a predecessor symbol. A symbol graph having nodes and links is constructed by backtracking through the strokes from the last stroke to the first stroke and assigning scores to the links based on the path scores for the symbol-relation pairs. The symbol graph is used to recognize a mathematical expression based in part on the scores for the links and the mathematical expression is stored.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Under the embodiments described herein, a sequence of symbols $\hat{S}$ and a sequence of spatial relations $\hat{R}$ is determined from a sequence of observed input strokes O. In some embodiments, the symbol sequence and relation sequence are computed as:

$$\hat{S}, \hat{R} = \underset{S,R}{\operatorname{argmax}}\{ P(S|R)P(R)\underset{B}{\max}P(O|B, S, R)P(B|S, R)\} \quad \text{EQ. 1}$$

where S is a symbol sequence, R is a spatial relation sequence $r_1, r_2 \ldots r_M$ where $r_m$ denotes the relative spatial position of symbol m to symbol m−1, B is a stroke boundary sequence that indicates boundaries between groupings of strokes that represent symbols, and O is the input stroke sequence. In addition, P(O|B,S,R) is an observation likelihood that provides the probability of the input stroke sequence given a stroke boundary sequence, a symbol sequence and a spatial relation sequence; P(B|S,R) is a symbol duration probability that provides the probability of the stroke boundary sequence given a symbol sequence and a spatial relation sequence, P(S|R) is a syntactic structure probability that provides the probability of a symbol sequence given a spatial relation sequence, and P(R) is a spatial structure probability that provides a prior probability for a spatial relation sequence.

Under one embodiment, the observation likelihood P(O|B, S,R) is determined as:

$$P(O|B, S, R) = P(o_1^N|b_1^M, s_1^M, r_1^M) \quad \text{EQ. 2}$$

$$= P(o_{(1)}^{(M)}|s_1^M, r_1^M)$$

$$= \prod_{m=1}^{M} P(o_i^{(m)}|s_m)P(o_g^{(m)}|s_m)P(o_r^{(m)}|r_m)$$

where N represents the number of input strokes, M represents the number of segments for a segmentation of the input strokes, $P(o_i^{(m)}|s_m)$ is a symbol likelihood that provides the probability of features $o_i^{(m)}$ extracted from a normalized image associated with the mth segment given hypothesis symbol $s_m$ for the mth segment, $P(o_g^{(m)}|s_m)$ is a grouping likelihood that provides a score indicative of the likelihood that the input strokes for the mth segment would be grouped into a symbol given a hypothesis symbol $s_m$ based on shape features $o_g^{(m)}$, and $P(o_r^{(m)}|r_m)$ is a spatial relation likelihood that provides the probability of spatial relation features $o_r^{(m)}$ given a spatial relation $r_m$ between the mth segment and the m−1th segment.

Figure 1:
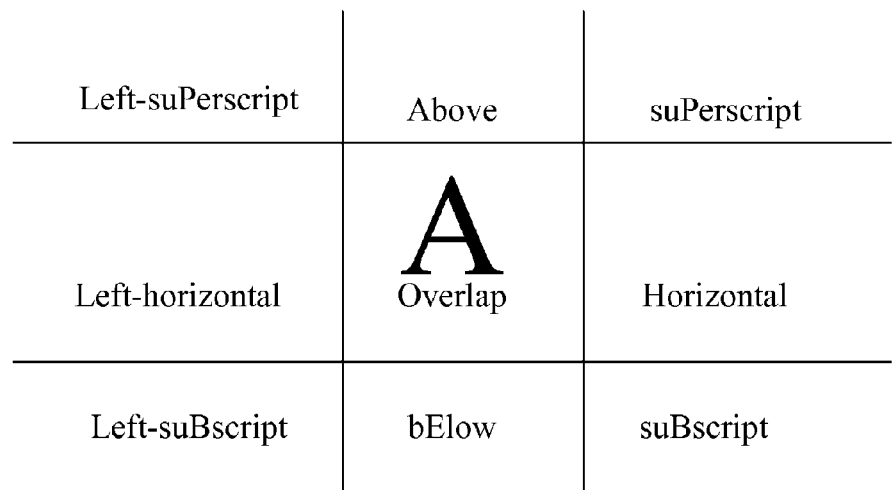
FIG. 1 is a graph showing possible spatial relations between two symbols in an equation.

Under one embodiment, nine types of spatial relations are defined as shown in FIG. 1. These relations include left-superscript (LP), above (A), and superscript (P), which are all above the previous symbol, left-horizontal (L), overlap (O), and horizontal (H), which are all inline with the previous symbol, and left-subscript (LB), below (E), and subscript(B), which are each below the previous symbol.

The symbol duration probability provides the probability that a number of strokes that will be used to represent a symbol in an input. This probability is calculated as:

$$P(B|S, R) = P(b_1^M|s_1^M) = \prod_{m=1}^{M} P(b_m - b_{m-1}|s_m) \quad \text{EQ. 3}$$

where $b_m$ is the stroke index of the ending boundary for the current symbol $s_m$ and $b_{m-1}$ is the stroke index for the ending boundary for the previous symbol.

The syntactic structure probability provides the probability of a symbol given the context of the symbol. In particular, the probability of a symbol is determined based on the preceding symbol and the spatial relationship between the two symbols as:

$$P(S|R) = P(s_1^M|r_1^M) = \prod_{m=1}^{M} P(s_m|s_{m-1}, r_m) \quad \text{EQ. 4}$$

where $s_m$ is the symbol of the mth segment, $s_{m-1}$ is the symbol of the preceding segment, and $r_m$ is the relationship between symbol $s_m$ and symbol $s_{m-1}$.

The spatial structure probability provides a probability for a sequence of spatial relations in a mathematical equation. In general, this probability reflects the fact that mathematical expressions follow certain grammars. For example, "$a^{2b}$" occurs more rarely "$a^2b$". Under one embodiment, a spatial relation bigram is used to define this probability as:

$$P(R) = P(r_1^M) = \prod_{m=1}^{M} P(r_m|r_{m-1}) \quad \text{EQ. 5}$$

where $r_m$ is the relationship between symbol $s_m$ and previous symbol $s_{m-1}$ and $r_{m-1}$ is the relationship between symbol $s_{m-1}$ and further previous symbol $s_{m-2}$.

Figure 2:
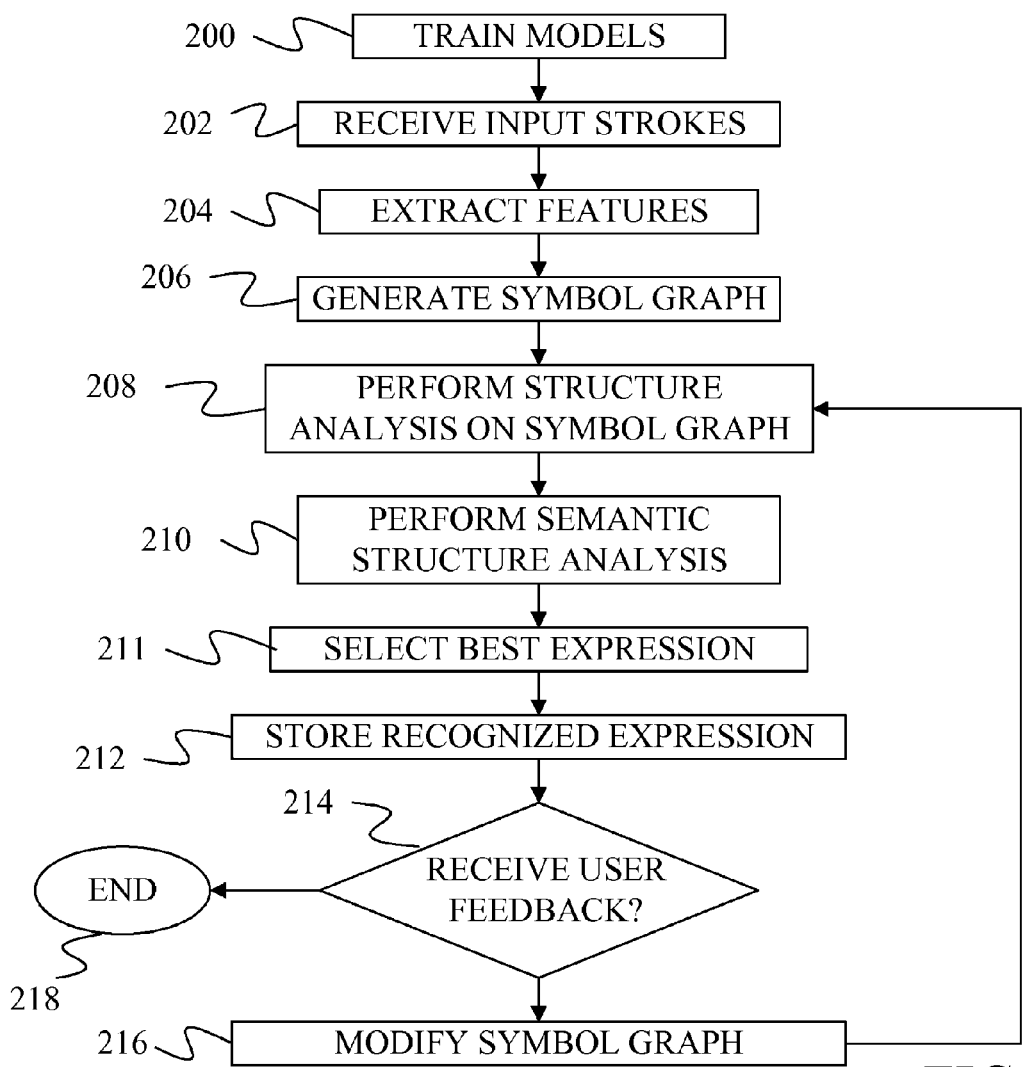
FIG. 2 is a flow diagram of a method of performing recognition of handwritten mathematical expressions.
Figure 3:
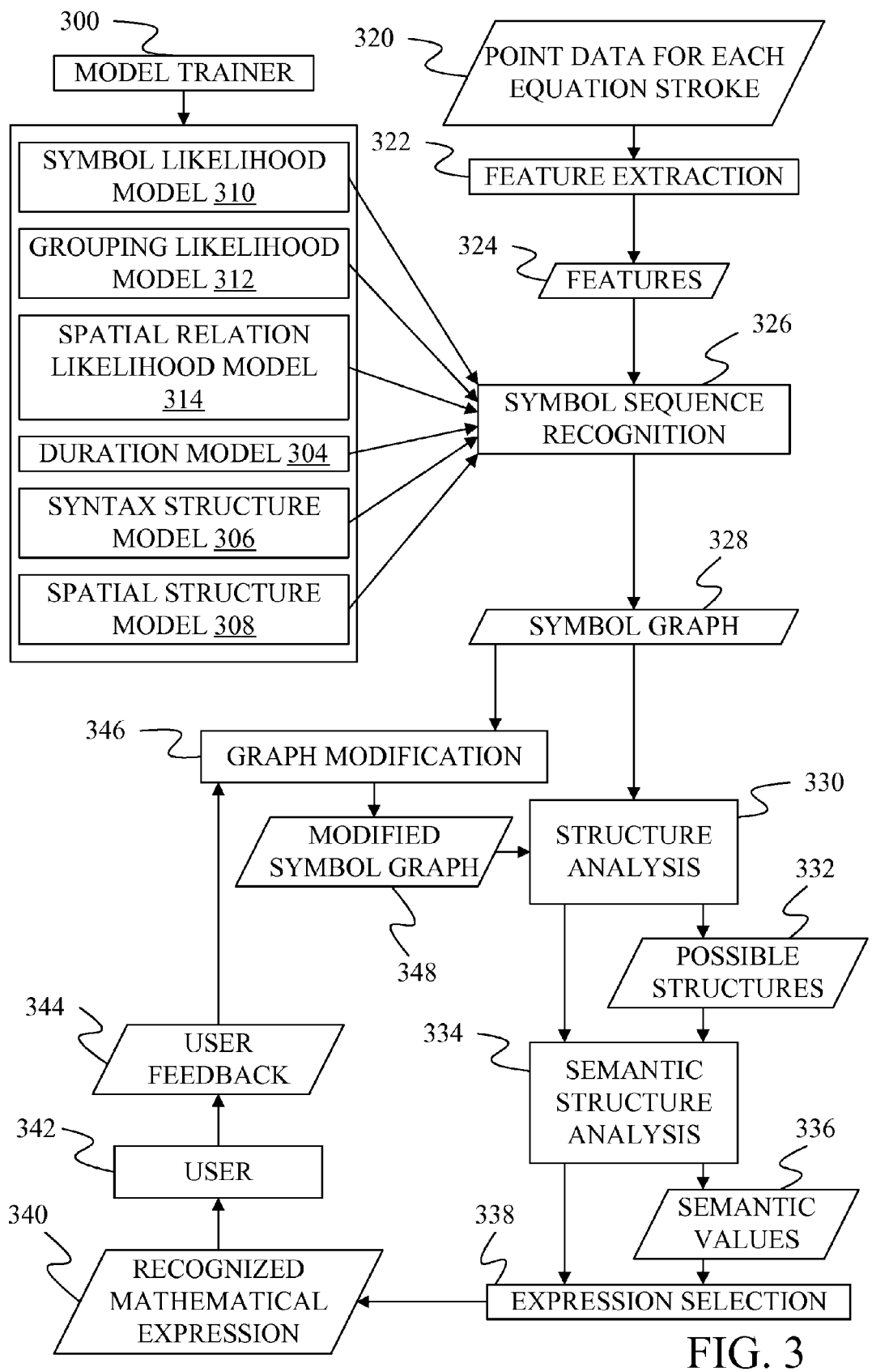
FIG. 3 is a block diagram of elements used in recognizing handwritten mathematical expressions.

The flow diagram of FIG. 2 provides a method of training and using these models to recognize a handwritten mathematical expression. The block diagram of FIG. 3 provides elements used in the flow diagram of FIG. 2.

In step 200 of FIG. 2, duration model 304, syntax structure model 306, spatial structure model 308, symbol likelihood model 310, grouping likelihood model 312 and spatial relation likelihood model 314 are trained by a model trainer 300. The training performed by model trainer 300 is described further below in connection with FIG. 4. Once the models have been trained, point data 320 representing input strokes for a handwritten equation are received at step 202. At step 204, features are extracted from data 320 by a feature extraction unit 322 to form features 324. A method for feature extraction under one embodiment is described below in connection with FIG. 5.

Features 324 are applied to a symbol sequence recognition unit 326, which uses features 324 to construct a symbol graph 328. The production of a symbol graph 328 is discussed below in connection with FIGS. 6-10. Symbol graph 328 consists of nodes connected by links, where each link represents a symbol, a spatial relation, and an ending stroke, and where each link has an associated score.

Symbol graph 328 is applied to a structure analysis unit 330 at step 208. Structure analysis unit 330 uses paths through symbol graph 328 to identify and score possible structures 332 such as groupings of symbols that may form a numerator or denominator. Possible structures 332, and their respective scores, are then provided to a semantic structure analysis unit 334 at step 210 to identify and score possible semantic values 336 in structures 332. For example, semantic structure analysis unit 334 may determine how likely it is that "x" is a variable and how likely "x" is the multiplication operator. Symbol graph 328, possible structures 332 and semantic values 336 are provided to expression selection 338, which uses the scores found in symbol graph 328, possible structures 332 and semantic values 336 to select a recognized mathematical expression 340 at step 211. The recognized mathematical expression is then stored on a computer-readable medium at step 212.

Under one embodiment, stored mathematical expression 340 is displayed to a user 342 in a manner that allows the user to edit mathematical expression 340. Such editing can include deleting symbols, moving symbols, replacing symbols and extending or shortening positional markers such as horizontal lines. The editing by user 342 results in user feedback 344. If user feedback 344 is received at step 214, user feedback 344 is applied to graph modification unit 346, which modifies symbol graph 328 based on the user feedback to produce modified graph 348 at step 216. Modified graph 348 is then applied to structure analysis 334 by returning to step 208. Steps 208-212 are then performed to select and store a new mathematical expression based on modified symbol graph 348. Forming the modified graph and selecting a new recognized mathematical expression are discussed further below in connection with FIG. 11. When there is no further user feedback at step 214, the process of FIG. 2 ends at step 218.

Figure 4:
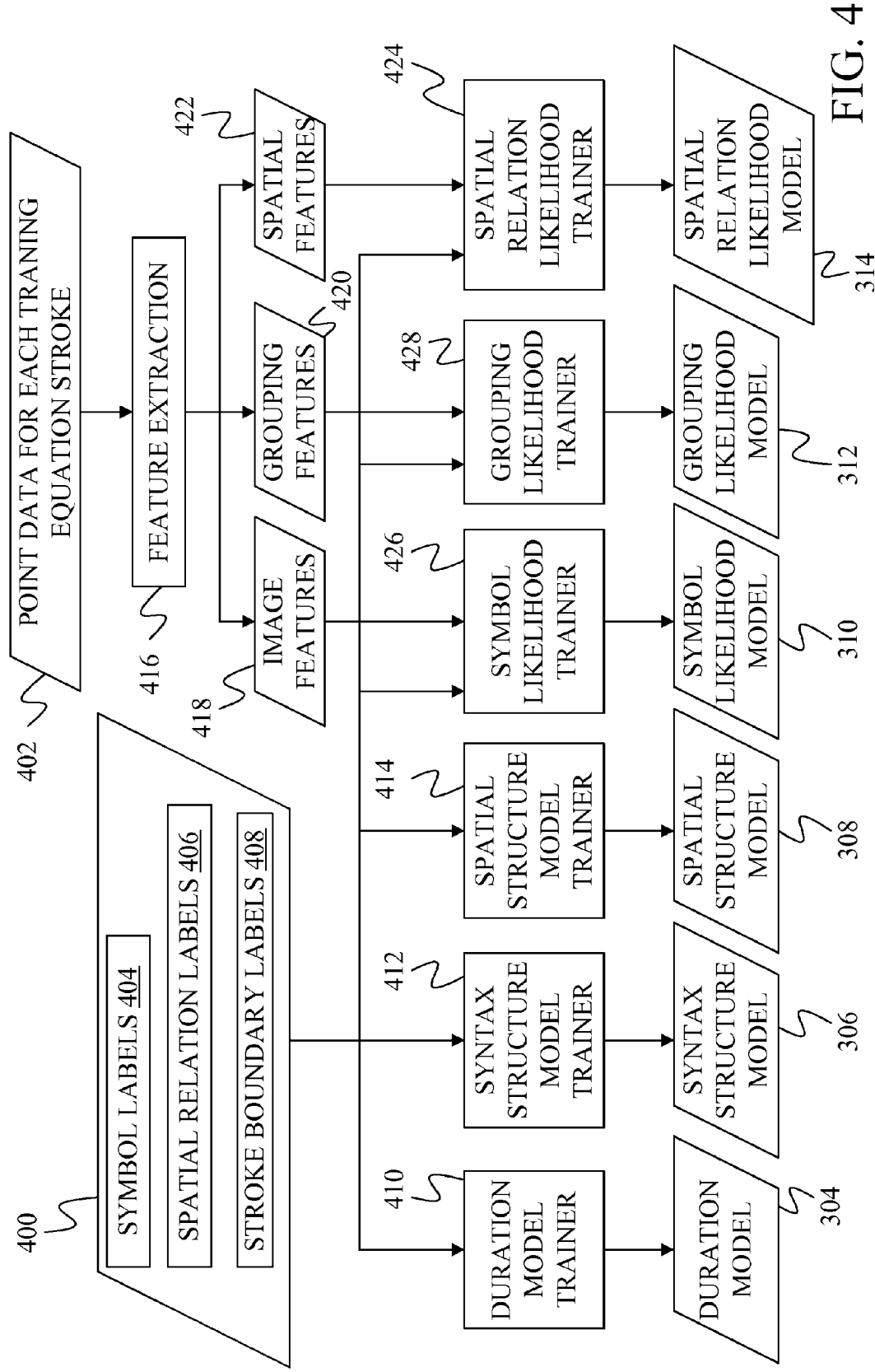
FIG. 4 is a block diagram of elements used to train a handwritten mathematical expression recognizer.

FIG. 4 provides a block diagram of elements used in training step 200 of FIG. 2 to train the various models used to perform symbol-relation sequence recognition under one embodiment. To train the models, training data consisting of label data 400 and point data 402 for a set of handwritten equations is collected. Label data 400 consists of symbol labels 404, spatial relation labels 406, and stroke boundary labels 408. Stroke boundary labels group sequences of strokes into symbol segments. Symbol labels 404 identify a symbol for each symbol segment and spatial relation labels 406 provide the spatial relations between consecutive symbols. Under one embodiment, label data 400 is formed by a person who sets the stroke boundaries, and identifies the symbols and spatial relations for each sequence of input strokes.

Point data 402 includes x,y position data for each of a set of sampling points of each stroke in the set of training handwritten equations. Such x,y positions can be determined by applying a grid to a handwritten equation and identifying those squares in the grid that contain a portion of a stroke. An x,y position for the square is then stored as a point in the stroke. The position data may be acquired offline by applying the grid to an image, or may be determined online by defining the grid before receiving input strokes for the training equation, and assigning portions of the input stroke to grid squares as the stroke is made by the user. For online training, additional data concerning the trajectory and speed of the stroke may be collected.

Label data 400 is used by a duration model trainer 410, a syntax structure model trainer 412 and a spatial structure model trainer 412 to form duration model 304, syntactic structure model 306 and spatial structure model 308, respectively. Duration model 304 is formed by using the symbol labels 404 and stroke boundary labels 408 to collect the number of strokes used to form each symbol. For each symbol and number of strokes found in the training data, a probability is calculated as:

$$P(n-m|s) = \frac{c(n-m,s)}{c(s)} \qquad \text{EQ. 6}$$

where $P(n-m|s)$ is the probability of n–m strokes being used to form symbol s, $c(n-m,s)$ is the number of times n–m strokes were used to form symbol s in training label data 400, and $c(s)$ is the number of times symbol s is found in training label data 400. To accommodate unseen symbols or unseen numbers of strokes for symbols, smoothing may be applied to the probabilities. The resulting probabilities for each combination of symbol and number of strokes are then stored as duration model 304.

Syntax structure model 306 is formed by computing a probability for each symbol given the preceding symbol and the spatial relation between the preceding symbol and the symbol. Under one embodiment, these probabilities are computed as:

$$P(s|s', r) = \frac{c(s, s', r)}{c(s', r)} \qquad \text{EQ. 7}$$

where $P(s|s',r)$ is the probability of a current symbol s given a preceding symbol s' and a spatial relation r between symbol s and symbol s', $c(s,s',r)$ is a count of the number of times that s appears in relationship r with symbol s' in training label data 400 and $c(s',r)$ is a count of the number of times that preceding symbol s' appears in a spatial relationship r with any symbol. For symbols or spatial relations that do not appear in label training data 400, smoothing can be used to approximate the probability for the symbol given a preceding symbol and a spatial relation. The computed probabilities are stored as syntax structure model 306.

Spatial structure model 308 consists of a set of probabilities that describe the probability of a relationship r between a symbol $s_m$ and a preceding symbol $s_{m-1}$ and a preceding relationship r' between preceding symbol $s_{m-1}$ and the symbol which precedes it, $s_{m-2}$. Under one embodiment, these probabilities are computed as:

$$P(r|r') = \frac{c(r, r')}{c(r')} \qquad \text{EQ. 8}$$

where $P(r|r')$ is the probability of a current spatial relation r, given a preceding spatial relation r', $c(r,r')$ is the number of times a spatial relation r' is followed by a spatial relationship r in label data 400 and $c(r')$ is the number of times that the spatial relation r' is found in label data 400. For spatial relations that do not appear in label data 400, smoothing can be used to approximate the probability. The computed probabilities are stored as spatial structure model 308.

Label data 400 is also used with point data 402 to construct symbol likelihood model 310, grouping likelihood model 312 and spatial relation likelihood model 314. To form these models, features must be extracted from point data 402 by a feature extraction unit 416. Under one embodiment, three separate types of features are extracted that include image features 418, grouping features 420 and spatial features 422.

Figure 5:
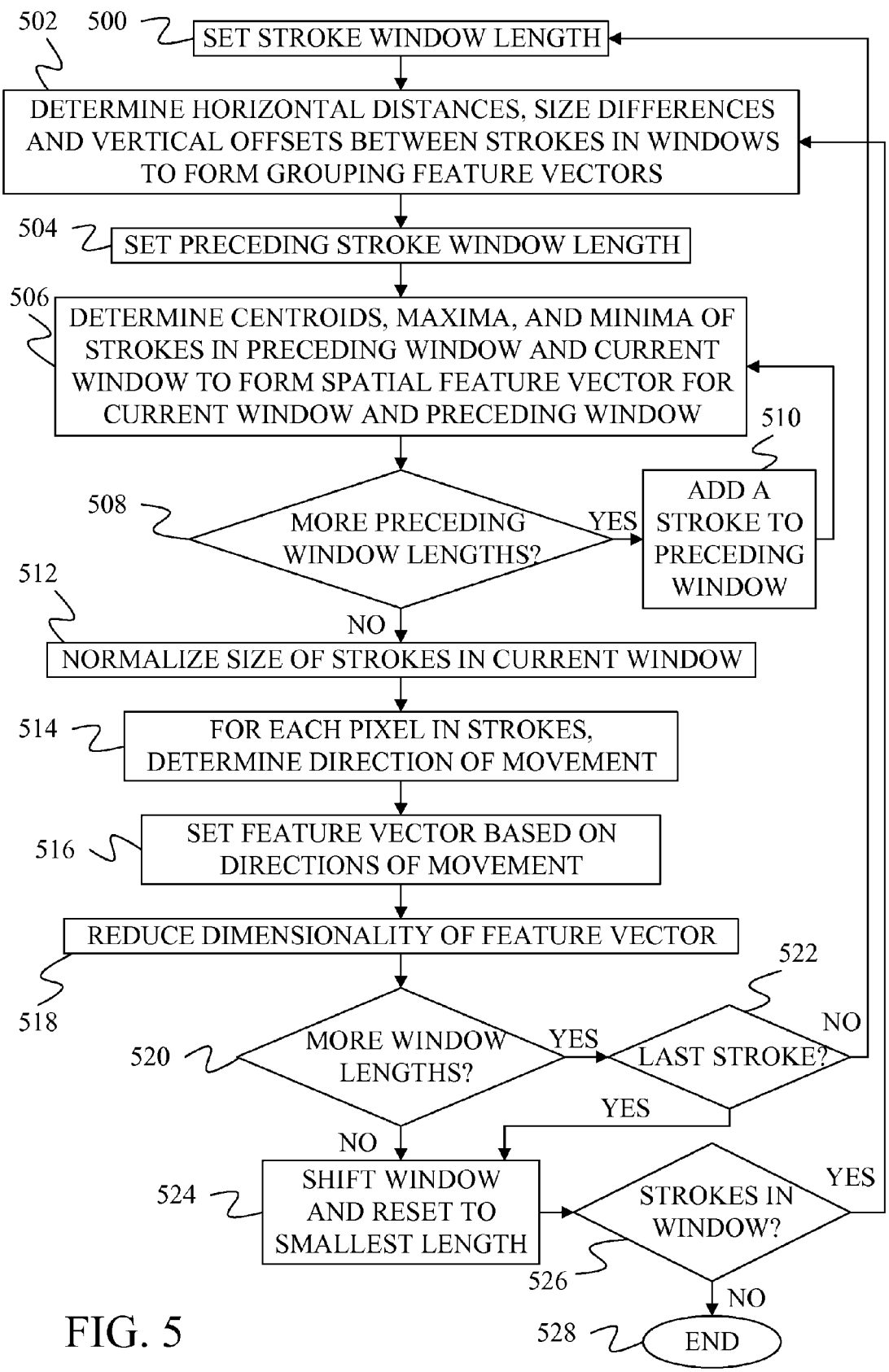
FIG. 5 is a flow diagram for feature extraction.

FIG. 5 provides a flow diagram for extracting features from point data 402. This method may be used in feature extraction unit 416 and feature extraction unit 322 of FIG. 3. In step 500 of FIG. 5, a stroke window length is set. The window length describes the number of strokes that are grouped together in a window. At step 502, the horizontal distances, size differences and vertical offsets between the strokes within the current window are used to form grouping feature vectors. In particular, for each stroke, a mean horizontal position and a mean vertical position is determined as well as a horizontal size and vertical size.

The horizontal distances between the horizontal means of each stroke in the window is then determined. For example, if there are four strokes, six horizontal distances would be determined. These horizontal distances are averaged to determine the average horizontal distance between strokes in the window, which is then placed in the grouping feature vector 420. Similarly, the vertical distances between the vertical means of each stroke are determined and are averaged to from an average vertical offset that is stored in the grouping feature vector 420.

The differences in the horizontal size and the vertical size of each stroke relative to each other stroke in the window are also determined. The average horizontal size difference and the average vertical size difference are then stored as part of the grouping feature vector 420 for the current window.

At step 504, a window length is set for a preceding stroke window. Typically, this window length is initially set to one stroke. At step 506, the horizontal maximum, the horizontal minimum, the vertical maximum, the vertical minimum and the centroid of the strokes in the preceding window and the current window are determined and are stored as the spatial feature vector 422 for the current window and preceding window.

At step 508, the method determines if there are more preceding window lengths that spatial feature vectors should be determined for. If there are more preceding window lengths, a stroke is added to the preceding window at step 510 by adding a stroke that precedes the existing preceding window in the sequence of strokes in data 502. The process then returns to step 506 to determine centroids, maxima and minima for the preceding window and the current window and to store those values as the spatial feature vector for the current window and the newly formed preceding window. Steps 506, 508 and 510 are repeated until a maximum window length has been reached for the preceding window at step 508.

At step 512, the size of the strokes in the current window are normalized, this normalization can be a linear or non-linear normalization to a standard height and width for the combination of strokes in the window.

At step 514, each pixel in the normalized strokes is examined to determine a direction of movement of the stroke at that pixel. Specifically, the writing direction is determined as an angle alpha between a line from the previous sampling point t–1 to a current sampling point t and a horizontal line. The angle alpha may be computed as:

$$\cos\alpha = \left(\frac{\Delta x(t)}{\sqrt{\Delta x^2(t) + \Delta y^2(t)}}\right) \qquad \text{EQ. 9}$$

$$\sin\alpha = \left(\frac{\Delta y(t)}{\sqrt{\Delta x^2(t) + \Delta y^2(t)}}\right) \qquad \text{EQ. 10}$$

$$\Delta x(t) = x(t) - x(t-1) \qquad \text{EQ. 11}$$

$$\Delta y(t) = y(t) - y(t-1) \qquad \text{EQ. 12}$$

where x(t),y(t) are the x,y coordinates of sampling point t and x(t−1),y(t−1) are the x-y coordinates of sampling point t−1. The angle alpha is then quantized into one of eight directions 0°, 45°, 90°, 135°, 180°, 225°, 270°, and 315° by selecting the quantized value that is closest to the value of alpha computed using equations 9-12.

At step 516, a feature vector is generated by dividing the normalized image of the strokes into 64 evenly-sized squares. In each square, a count is formed for each quantized direction that indicates the number of sampling points in the square with that writing direction. Thus, for each of the 64 squares, eight values are set resulting in a 512 dimensional vector.

At step 518, the 512-dimensional vector generated in step 516 is reduced to a 128-dimensional feature vector. To form this reduced feature vector, linear discriminant analysis may be used, as is well known in the art. The reduced dimensionality feature vector is then stored as image features 418.

At step 520, the process determines if there are more window lengths for the current window. If there are more window lengths, the process determines if the current window includes the last stroke in a sequence of strokes for an equation. If the current window does not include the last stroke, the process returns to step 500 to set a new window length by adding an additional stroke from the sequence of strokes to the current window. Steps 502 though 520 are then repeated for the new window length.

If there are no more window lengths at step 520, or if the current window includes the last stroke for the current equation at step 522, the current window is shifted by one stroke and is reset to the smallest window length, typically one stroke, at step 524. At step 526, the process determines if there are any strokes in the current window, if there are strokes in the current window, the process returns to step 502 and steps 502 through 520 are repeated for the current window. If there are no strokes in the current window, the end of the stroke sequence has been reached for this equation and the process ends at step 528.

Spatial feature vectors 422 formed through the feature extraction method of FIG. 5 are used by a spatial relation likelihood trainer 424 to form spatial relation likelihood model 314. In one embodiment, spatial relation likelihood model 314 is a Gaussian mixture model. To construct the Gaussian mixture model, spatial relation likelihood trainer 424 groups spatial feature vectors 422 into a mixtures of Gaussian distributions using expectation maximization training. Specifically, for each spatial relation type in label data 400, a separate mixture of Gaussians is formed using the feature vectors 422 for that relation type. The weights for the resulting mixtures may later be refined using discriminative training as is known in the art.

Similarly, image features 418 are used by a symbol likelihood trainer 426 to train symbol likelihood model 310 by construing a Gaussian mixture model using an expectation maximization algorithm and discriminative training. In particular, a separate Gaussian mixture model is formed for each symbol in label data 400 by grouping the image features 418 associated with each labeled symbol into distribution mixtures.

Grouping likelihood trainer 428 uses grouping features 420 and label data 400 to form grouping likelihood model 312. Under one embodiment, grouping likelihood model 312 is discriminatively trained to set the parameters of a scoring function:

$$f(d, \delta, \sigma) = \frac{1}{1 + \left(\frac{d}{d_0}\right)^\alpha + \left(\frac{\delta}{\delta_0}\right)^\beta + \left(\frac{\sigma}{\sigma_0}\right)^\lambda}, \alpha, \beta, \gamma > 1 \qquad \text{EQ. 13}$$

where d is a horizontal distance between strokes, $\delta$ is the average size difference between strokes, $\sigma$ is the average vertical offset between strokes, $d_0$ is a threshold horizontal distance, $\delta_0$ is a threshold size difference, $\sigma_0$ is a threshold vertical offset, and $\alpha$, $\beta$ and $\gamma$ are parameters for adjusting the relative contribution of the horizontal distance, size difference, and vertical offset to the final score. The average horizontal distance d, the average size difference $\delta$ and the average vertical offset $\sigma$ are taken from grouping features 320. The threshold horizontal distance $d_0$, the threshold size difference $\delta_0$, the threshold vertical offsets $\sigma_0$ and $\alpha$, $\beta$ and $\gamma$ are trained using discriminative training to provide higher scores using EQ. 13 for groupings of strokes that represent a symbol and lower scores for grouping of strokes that do not represent a symbol. Once the parameters have been set, grouping likelihood model 312 has been trained.

Figure 6:
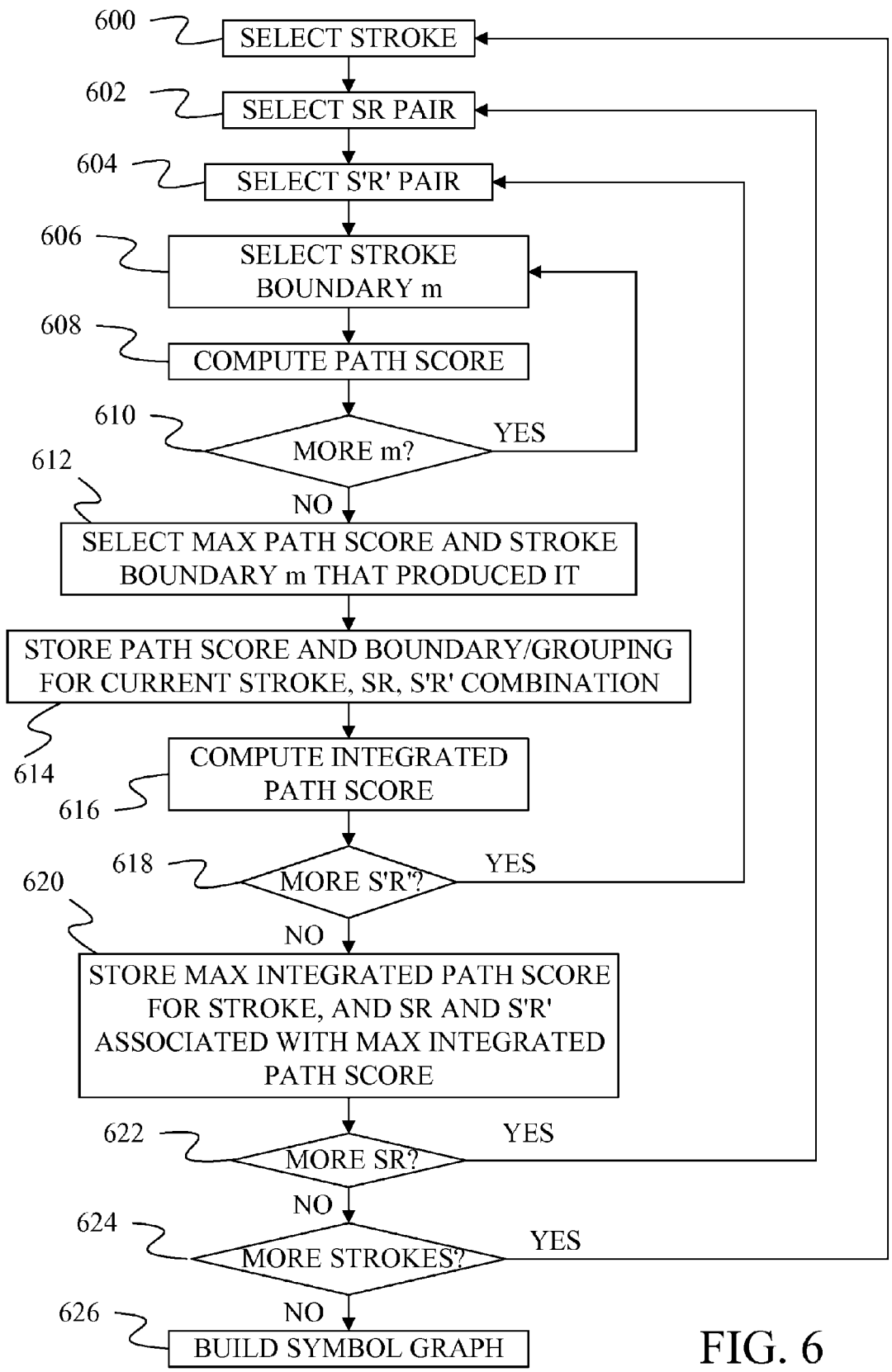
FIG. 6 is a flow diagram of a method of decoding a symbol sequence.
Figure 7:
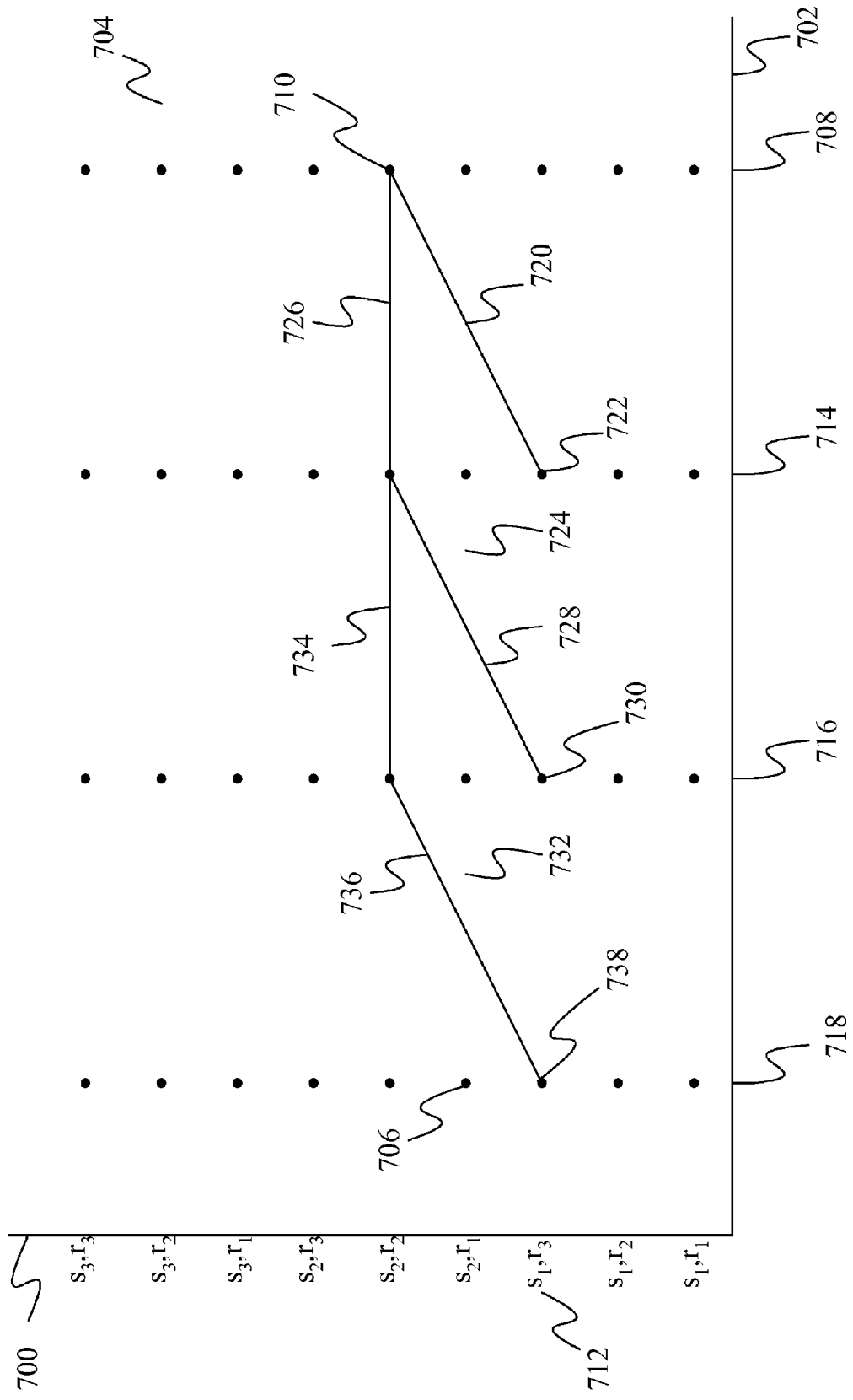
FIG. 7 is a graph of a symbol-relation sequence and stroke trellis.

After the models have been trained, they may be used in decoding as shown in the flow diagram of FIG. 6. The method of FIG. 6 involves performing a forward pass through a trellis consisting of a set of symbol/spatial relation pairs for each stroke. During the forward pass, path scores are determined for paths through the trellis from a first stroke of the stroke sequence to a last stroke of the stroke sequence. FIG. 7 provides a graph of such a trellis 704 with symbol-relation pairs shown on vertical axis 700 and strokes shown along horizontal axis 702. Each state or point in trellis 704 represents a symbol-relation pair for a particular stroke where the symbol-relation pair consists of a symbol and a spatial relation between the symbol and a predecessor symbol. For example, point 706 represents a symbol $s_2$ and a spatial relation $r_1$ for the first stroke in the input stroke sequence. The graph of FIG. 7 is only an example and provides only a limited number of symbols and spatial relations for illustrative purposes. In practice, a separate symbol-relation pair would be provided for each symbol in a grammar and each of the nine spatial relation shown in FIG. 1.

In step 600 of FIG. 6, the first stroke in the sequence of strokes representing an input equation is selected. At step 602, a combination of a current symbol, s, and a current spatial relation, r, between the current symbol and a previous symbol is selected. At step 604, a previous symbol-relation pair, s'r', representing another symbol or a different relationship is selected.

At step 606, a stroke boundary m between the current symbol s and the previous symbol s' is selected.

In FIG. 7, selecting a current symbol-relation pair for a stroke involves selecting for example selecting state 710 for symbol $s_2$ in spatial relation $r_2$ for stroke 708. Selecting a previous symbol-relation pair involves, for example, selecting symbol-relation pair 712 for $s_1 r_3$ in FIG. 7. Selecting a stroke boundary m involves selecting a stroke that represents the last stroke of preceding symbol-relation pair 712 such as one of strokes 714, 716 and 718.

At step 608, a path score is computed that represents a score for a path up to the selected stroke m that ends in current symbol-relation pair sr with predecessor s'r'. This path score is computed as:

$$\text{Pathscore} = P(o_{m+1}^n; n-m|sr) H(m; s'r') \qquad \text{EQ. 14}$$

where $$P(o_{m+1}^n; n-m|sr) = P(o_{m+1}^n|sr) \cdot P(n-m|s) \qquad \text{EQ. 15}$$

and where $P(o_{m+1}^n|sr)$ is computed using EQ. 2 above based on symbol likelihood model 310, grouping likelihood model 312 and spatial relation likelihood model 314 for the feature vectors observed for strokes m+1 to n, P(n−m|s) is taken from duration model 304, which was trained using equation 6 above and H(m,s'r') represents a best path score up to stroke m that ends in symbol pair s'r' as determined in a previous iteration, n is the current stroke, and m is the last stroke of the predecessor s'r'. Initially, the path score H(1;s'r') is set to the probability of symbol s' appearing at the start of an equation.

After the path score has been computed, the process determines if there are more stroke boundaries at step 610. In general, stroke boundaries are limited to some maximum number of strokes that are permitted to be in a symbol to reduce computations. If there are more stroke boundaries to consider, the next stroke boundary is selected at step 606 and a path score for that new stroke boundary is computed at step 608. Steps 606 through 610 are repeated until all of the stroke boundaries have been considered. For example, in FIG. 7, path scores would be generated for path 720 which joins state 722 to state 710, path 724 which consists of segments 726 and 728 and connects state 730 to state 710, and path 732 which includes segments 726, 734 and 736 and which connects state 738 to state 710, where each segment represents a stroke that is being associated with the current symbol.

At step 612, when there are no more stroke boundaries to consider, the stroke boundary that produces the maximum path score is selected. At step 614, the path score and the boundary are stored for the combination of stroke n, symbol-relation pair sr and predecessor symbol-relation pair s'r' as G(n;s'r',sr) and m(n;s'r',sr) respectively.

At step 616, an integrated path score is computed for using the maximum pathscore as:

$$\text{Integrated pathscore} = \{P(sr|s'r') \cdot G(n; s'r', sr)\} \qquad \text{EQ. 16}$$

$$P(sr|s'r') = P(s|s'r') P(r|r') \qquad \text{EQ. 17}$$

where P(s|s'r) is the syntactic structure probability of syntactic structure model 306 for current symbol s, in relation r with predecessor symbol s' and P(r|r') is computed from spatial structure model 308. The pathscore provides a score based on stroke level information while the integrated pathscore provides a score that is further based on symbol level information.

At step 618, the method determines if there are more predecessor symbol-relation pairs s'r' to be considered. Under one embodiment, each possible combination of symbol and relation that can be a predecessor to the current symbol-relation pair is considered. If there are additional predecessor s'r' to be considered, the next predecessor symbol-relation pair s'r' is selected by returning to step 604. Steps 608 through 616 are then repeated for the new predecessor pair. When an integrated path score has been computed for each predecessor pair at step 618, the maximum integrated path score and the predecessor symbol-relation pair s'r' associated with the maximum integrated path score are stored at step 620. Under one embodiment the maximum integrated path score is stored as H(n;sr), which is used in equation 14 above and the associated predecessor symbol-relation pair is stored as P(n;sr).

At step 622, the process determines if there are more symbol-relation pairs for the current stroke. Under one embodiment, each possible combination of symbol and spatial relation is selected at some point for a stroke in FIG. 6. If there are more symbol-relation pairs to be considered, the next symbol-relation pair is selected by returning to step 602 and steps 604 through 620 are performed for the newly selected symbol-relation pair.

When all of the symbol-relation pairs have been processed such that a maximum integrated pathscore has been selected for each symbol-relation pair and a predecessor pair s'r' has been identified that is associated with that maximum integrated pathscore, the process continues at step 624 where it determines if there are more strokes in the current input equation. If there are more input strokes, the next stroke is selected by returning to step 600 and steps 602 through 622 are repeated for the new stroke. When all of the strokes of the equation have been processed, an integrated path score and an associated predecessor pair and stroke boundary have been determined for each symbol-relation pair at each stroke of the trellis. The method then continues at step 626 where a symbol graph is built based on the integrated pathscores, and the stroke boundaries and predecessor pairs associated with those integrated pathscores.

Figure 8:
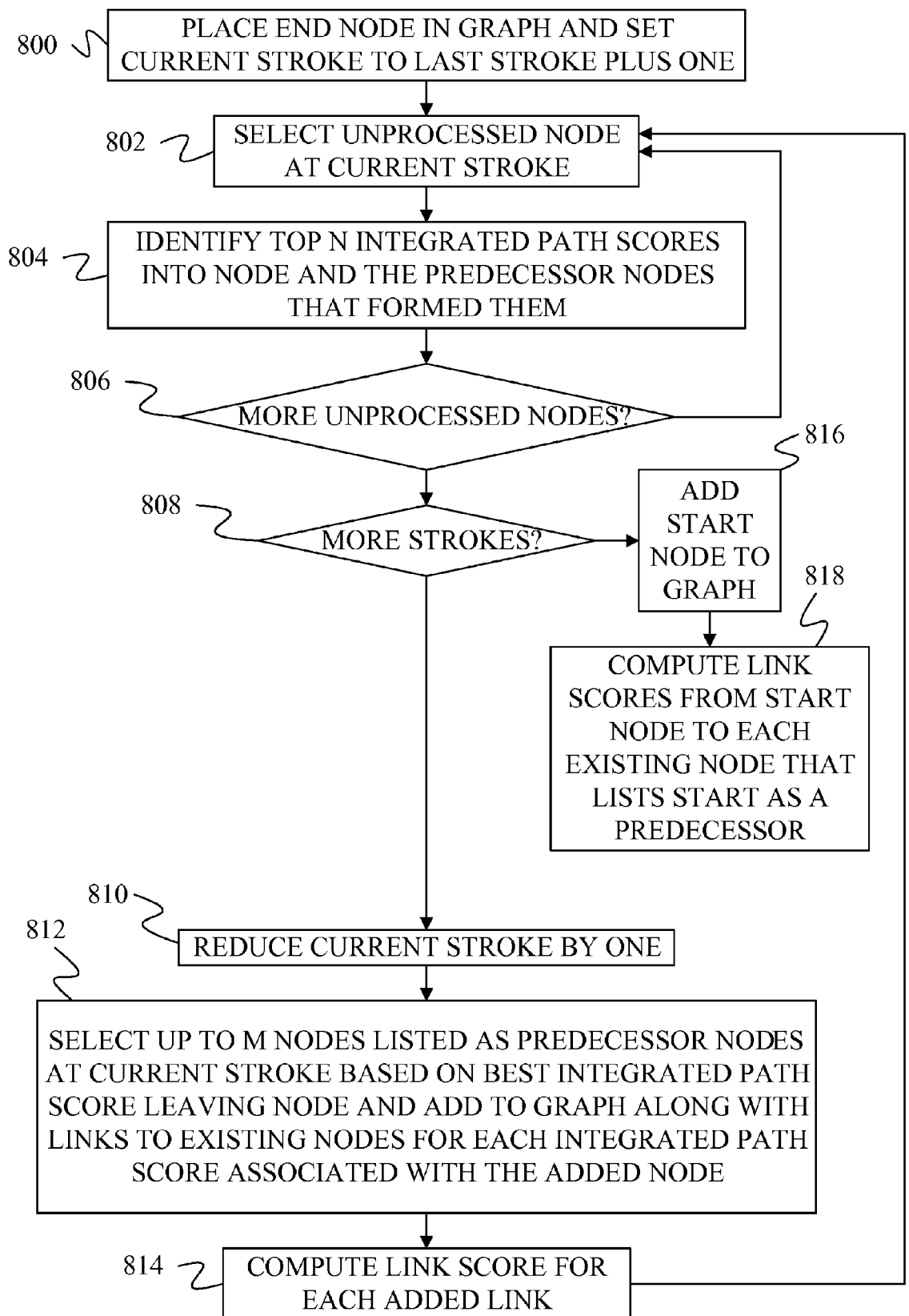
FIG. 8 is a flow diagram for building a symbol graph.
Figure 9:
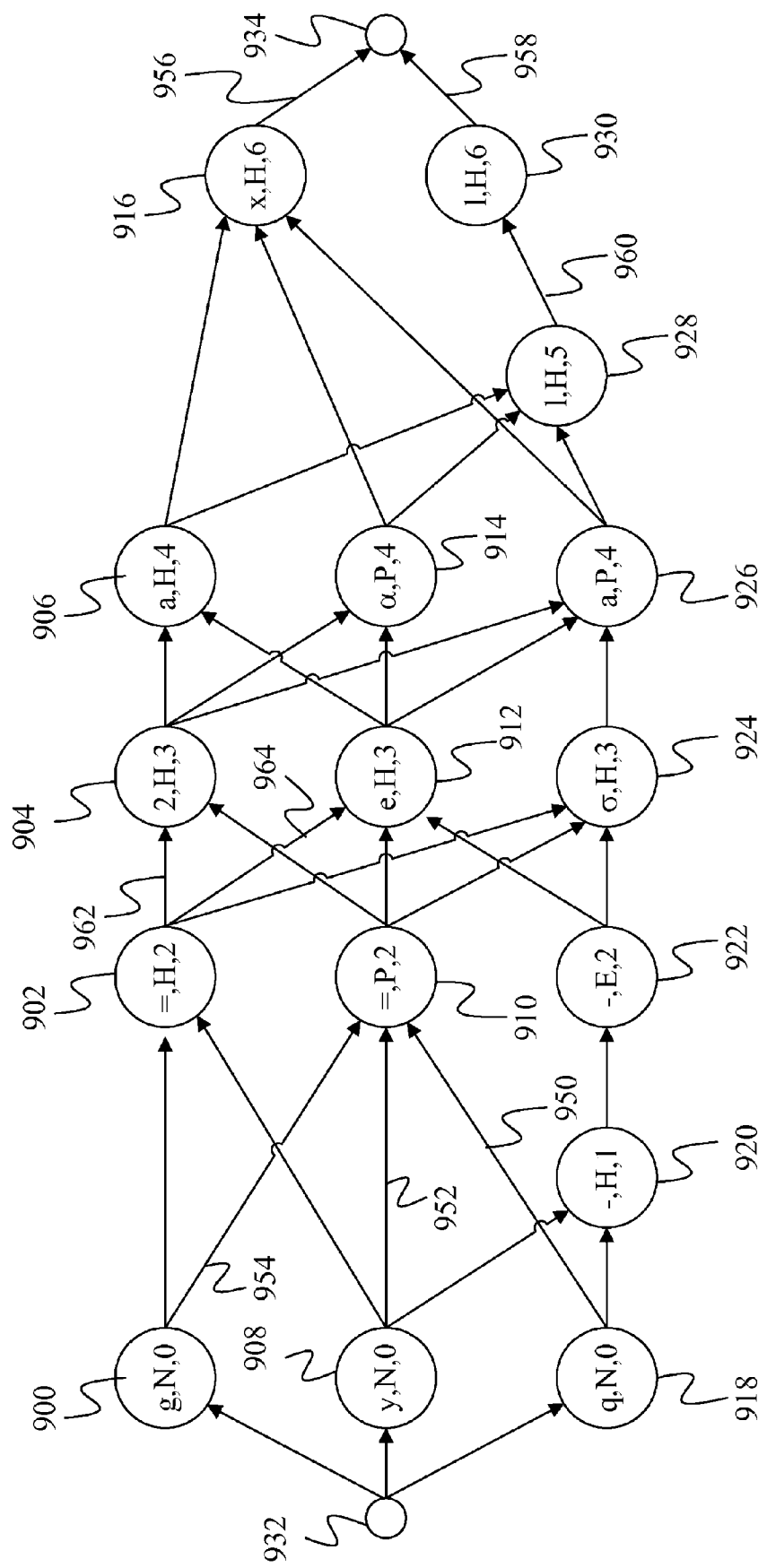
FIG. 9 is an example of a symbol graph.

FIG. 8 provides a flow diagram for building a symbol graph using the computed integrated pathscores from FIG. 6. FIG. 9 provides an example of a symbol graph. The graph includes a set of nodes such as nodes 900, 902, 904, 906, 908, 910, 912, 914, 916, 918, 920, 922, 924, 926, 928 and 930 as well as a starting node 932 and an ending node 934. Nodes are connected to each other by links or path segments where each path segment between two nodes represents a symbol-relation pair at a particular ending stroke. Each path segment has an associated score such that following a score can be generated for any path from start node 932 to end node 934 by summing the scores along the individual path segments on the path.

Each node includes a label with three values consisting of a symbol, a spatial relation, and an ending stroke for the symbol. For example, node 910 includes the symbol "=" the spatial relation "p", which stands for superscript, and the ending stroke value "2", where the strokes are numbered from 0 to N. Thus, each of the path segments 950, 952 and 954 into node 910 represent the symbol "=" and the spatial relation superscript and end at the third stroke in the input stroke sequence. Nodes 900, 908, and 918 represent the first symbols in an equation and as such include the spatial relation value "N" for none, since there is no predecessor symbol for the first symbol.

To construct the graph of FIG. 9, the method of FIG. 8 backtracks through the integrated path scores stored for the strokes by beginning with the last stroke and moving back to the first stroke in the equation. At step 800, an end node is placed in the graph and a current stroke is set to the last stroke of the stroke sequence for the equation plus 1. For example, in FIG. 9, end node 934 would be added to the graph and the current stroke would be set to "7".

At step 802, an unprocessed node is selected at the current stroke. A node is unprocessed when possible paths leading into the node have not been identified. On the first iteration, the only unprocessed node is node 934.

At step 804, the top n integrated pathscores into the selected unprocessed node are identified and the predecessor nodes that form those top n integrated pathscores are also identified as possible predecessor nodes that could be added to the symbol graph. In some embodiments, n may take on values such as 50, 100, 150, 200 or 1000. The integrated pathscores were computed and stored at step 616 of FIG. 6 together with the predecessor node that produced the integrated pathscore. Thus identifying the top n integrated path scores comprises retrieving the stored integrated path scores for the node and selecting the top n retrieved scores. The possible predecessor nodes are each associated with a stroke using the stroke boundary associated with the integrated path score and the last stroke of the current node. Thus, different predecessor nodes could be associated with different strokes.

At step 806, the process determines if there are more unprocessed nodes at the current stroke. For the initial iteration, there are no other unprocessed nodes. At step 808, the process determines if there are more strokes to be considered. If there are more strokes, the process reduces the current stroke by 1 at step 810. In FIG. 9, this would involve reducing the stroke count to 6 at this stage in the processing.

At step 812, up to m nodes listed as predecessor nodes at the current stroke are selected based on a best integrated pathscore leaving each node. For example, if a node was listed as a predecessor node for four integrated pathscores in step 804, the best integrated pathscore of those four integrated pathscores would be used as the integrated pathscore for the node. This pathscore would then be compared to all other predecessor nodes for this stroke and the m nodes with the highest best integrated pathscore would be selected and added to the graph. In some embodiments, m may take on values of 50, 100, 150, 200, or 1000. In FIG. 9, this process has resulted in nodes 916 and 930 being added to the graph.

Note that predecessor nodes with integrated pathscores that are all below a threshold value may also be pruned in step 812 so that fewer than m nodes are placed in the graph.

At step 814, a path segment score is computed for each path segment between the nodes selected for the current stroke and the nodes in the graph for later strokes. In particular, a path segment is constructed between each predecessor node added at step 812 and the node for which it was a predecessor in the determination of an integrated pathscore in step 804. The score for the path segment is computed as:

$$h(sr; m, n) = \frac{G(n; s'r', sr)}{H(m; s'r')}$$ Eq. 18 where h(sr;m,n) is the path segment score for the path segment between predecessor node s'r' at stroke m and node sr at stroke n, G(n;s'r',sr) is the maximum pathscore that ends at stroke n for symbol-relation pair sr with predecessor symbol-relation pair s'r' as calculated in step 612 of FIG. 6, and H(m;s'r') is the maximum integrated pathscore for symbol-relation pair s'r' at stroke m as computed at step 620 of FIG. 6.

Step 814 results in path segments 956 and 958 and scores for those path segments. In calculating the scores for segments 956 and 958, sr is set to the end node.

The process then returns to step 802 to select an unprocessed node at the current stroke. Both nodes 916 and 930 of FIG. 9 are unprocessed at this point. One of the nodes, for instance node 916, is then selected and step 804 is performed to identify the top n integrated pathscores into the node and the predecessor nodes that form those integrated pathscores. At step 806, the process determines if there are more unprocessed nodes and returns to step 802 to select node 930. Step 804 is then performed for node 930 to identify the top n integrated pathscores into that node. Returning to step 806, there are no more unprocessed nodes and the process determines if there are more strokes at step 806. Since there are more strokes, the stroke count is reduced by one at step 810 and up to m nodes listed as predecessor nodes at the current stroke are selected based on the best integrated pathscores leaving those nodes at step 812. The selected nodes are then added to the graph. Note that the nodes added in step 812 do not need to be linked to a node that is only one stroke away from the current stroke. Instead, a node may be selected that is a predecessor to a node that is multiple strokes apart from it.

In FIG. 9, step 812 results in node 928 being added to the graph. Step 814 is then performed for that node resulting in path segment 960 and an associated score for path segment 960 using EQ. 18. The process then returns to step 802 to select unprocessed node 928 described above. Step 804 is then performed to identify possible predecessor nodes for the node 928.

In a similar manner, additional nodes and path segments are added by stepping back through each stroke using steps 802 through 814. When there are no more strokes to be computed at step 808, for instance when nodes 900, 908 and 918 of FIG. 9 have been processed at step 804, the process continues at step 816 where a start node is added to the graph such as start node 932 of FIG. 9. At step 818, path segments from the start node to each node that lists the start node as a predecessor node are formed and path segment scores are computed for each of those segments. Under one embodiment, the path segments scores from the start node are computed as:

$$h(sr;start,n)=G(n;start,sr)$$ EQ. 19 where h(sr;start,n) is the path segment score for the path segment, and G(n;start,sr) is the maximum pathscore that begins at the start of an equation and ends at symbol relation pair sr at stroke n as computed in step 612 of FIG. 6.

Because each path segment in the resulting symbol graph has an associated score, it is possible to generate scores for paths through the graph of FIG. 9. These scores may be combined with further structure analysis to identify the best symbol relation sequence through the graph.

Figure 10:
FIG. 10 is a tabular representation of the symbol graph of FIG. 8.

To assist in the determination of the best path through the graph, the graph may be represented in a table format as shown in FIG. 10. In FIG. 10, the path segments or links are shown in a column 1000. For each path segment, the start node 1002 at the beginning of the path segment, the end node 1004 at the end of the path segment, the stroke index 1006 of the stroke at the end of the path segment, the symbol 1008, the spatial relation 1010 and the score 1012 for the path segment is provided.

Once the symbol graph has been constructed it may be used in structure analysis and semantic structure analysis as discussed above for FIG. 2 to identify and store a recognized equation.

Figure 11:
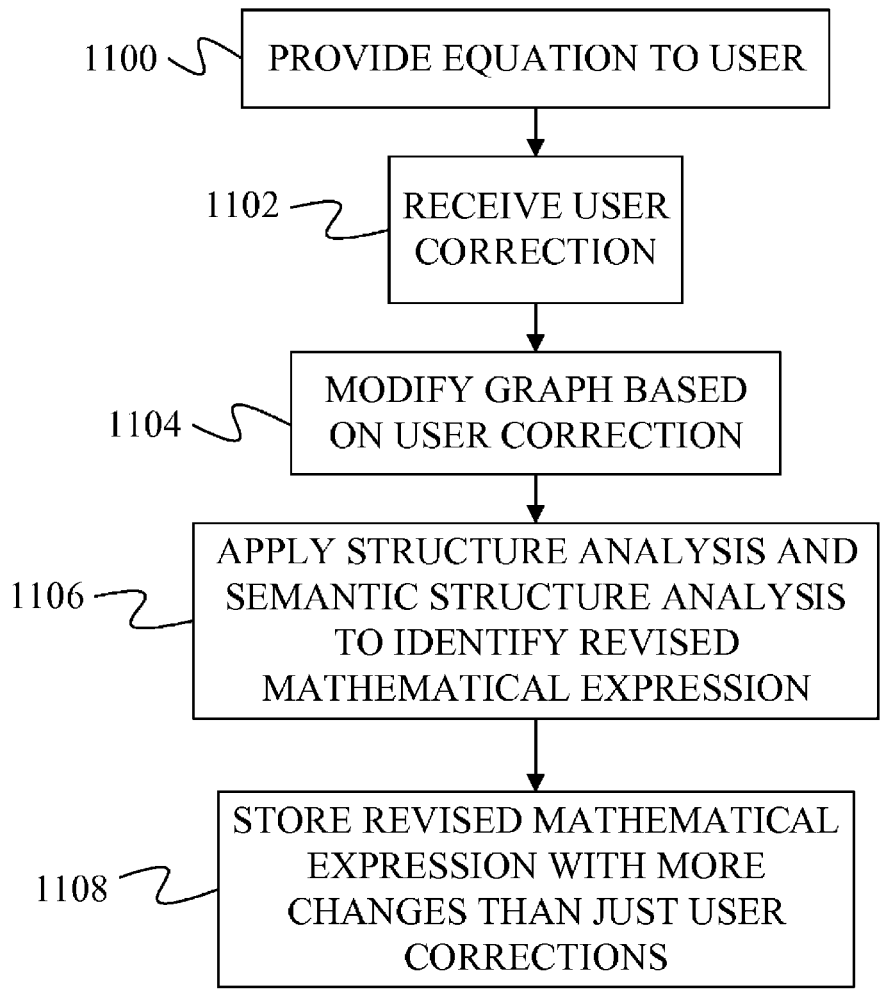
FIG. 11 is a flow diagram for revising a mathematical expression based on user input.

FIG. 11 provides a flow diagram for using user feedback to correct equations. In step 1100, equations are provided to the user. In some embodiments, the equations are provided to the user in an edit box so that the user can make changes to the equation. At step 1102, user corrections are received. These user corrections can include changing symbols, deleting symbols or moving the symbols relative to each other. At step 1104, the symbol graph is modified based on the user correction by removing nodes and path segments that are inconsistent with the user's modification. At step 1106, structure analysis and semantic structure analysis are applied to the modified graph to produce a revised mathematical expression. Because the symbol graph has been altered, a different path through the graph may be identified as the best path resulting in more changes to the mathematical expression than just the user corrections. The revised mathematical expression is then stored at step 1108.

For example, in FIG. 9, if the best path identified through the graph resulted in the recognized expression of $y^{=e^{ax}}$, which is found by following a path through nodes 908, 910, 912, 906 and 916 of FIG. 9 and the user corrects the equation so that it reads $y^{=e^{ax}}$, step 1104 would involve eliminating node 910 and nodes 920 and 922 as well as the path segments into and out of those nodes. With those nodes removed, structure analysis and semantic structure analysis 208 and 210 would be performed on the modified graph. This would result not only in the selection of node 902 instead of node 910, since only node 902 is available, but could also result in the selection of node 904 instead of node 912 since path segment 962 between node 902 and 904 may provide a higher score than path segment 964 between node 902 and node 912. This would result in an equation of y=2ax. Thus, through the use of the symbol graph, limited user feedback can result in more corrections to the recognized mathematical expression than the input provided by the user, thereby simplifying the task of correcting equations for the user.

Figure 12:
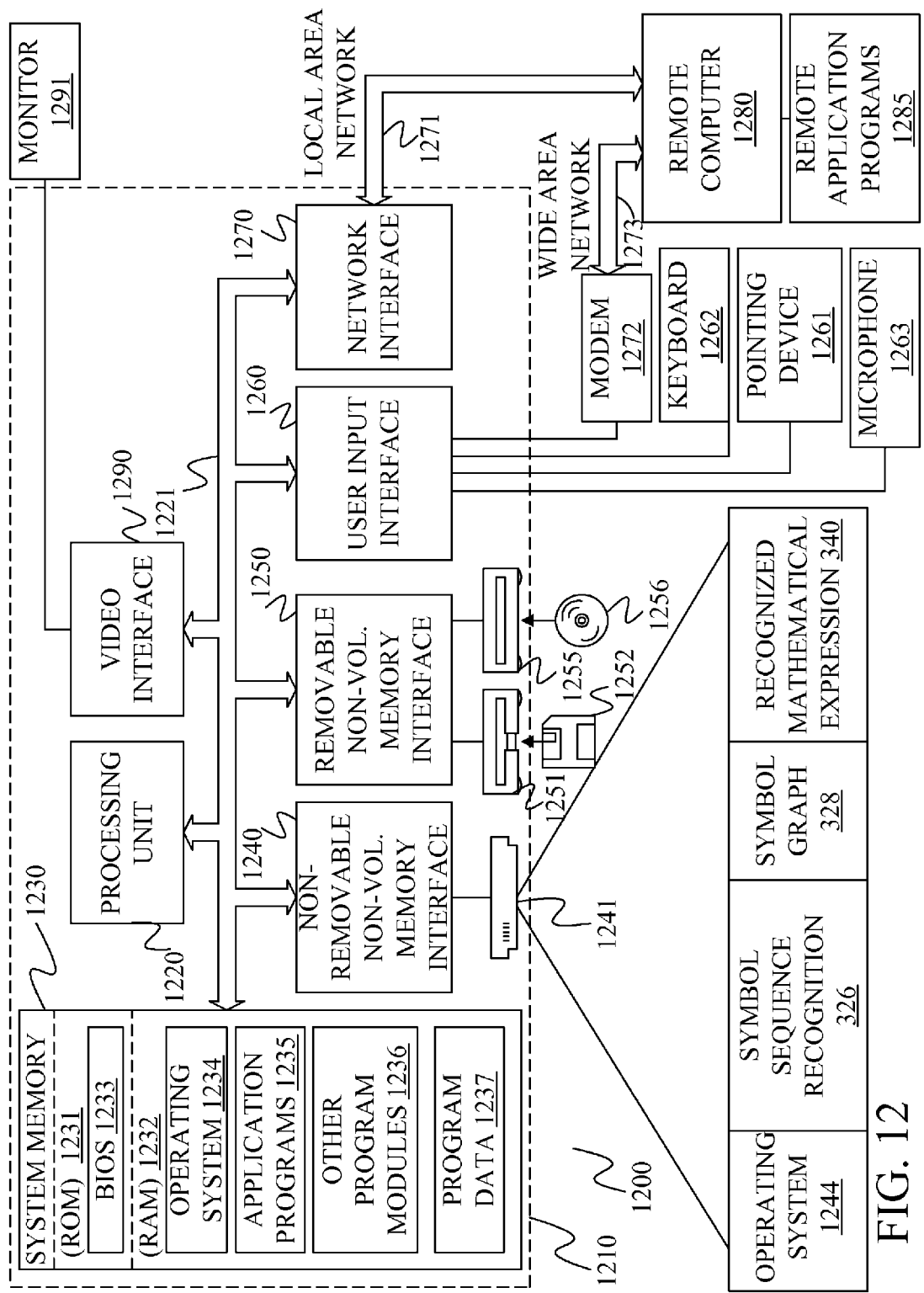
FIG. 12 is a block diagram of a general computing environment.

FIG. 12 illustrates an example of a suitable computing system environment 1200 on which embodiments may be implemented. The computing system environment 1200 is only one example of a suitable computing environment and is not intended to suggest any limitation as to the scope of use or functionality of the claimed subject matter. Neither should the computing environment 1200 be interpreted as having any dependency or requirement relating to any one or combination of components illustrated in the exemplary operating environment 1200.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 12, an exemplary system for implementing some embodiments includes a general-purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The methods described above may be executed in processing unit 1220 while using system memory 1230.

Computer 1210 typically includes a variety of computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The groupings and path scores as well as the recognized mathematical expressions may be stored on any of the computer readable media described above.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, symbol sequence recognition instructions 326, symbol graph 328 and recognized mathematical expression 340.

A user may enter commands and information into the computer 1210 through input devices such as a keyboard 1262, a microphone 1263, and a pointing device 1261, such as a mouse, trackball or touch pad. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290.

The computer 1210 is operated in a networked environment using logical connections to one or more remote computers, such as a remote computer 1280. The remote computer 1280 may be a personal computer, a hand-held device, a server, a router, a network PC, a peer device or other common network node, and typically includes many or all of the elements described above relative to the computer 1210. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on remote computer 1280. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving strokes representing a handwritten equation;
    for each stroke, a processing unit forming path scores for a combination of a symbol-relation pair that represents a symbol in a particular relation to a predecessor symbol and a predecessor symbol-relation pair that represents the predecessor symbol in a particular relation to a further predecessor symbol, wherein forming path scores comprises forming a plurality of path scores for the combination of the symbol-relation pair and the predecessor symbol-relation pair, each path score being associated with a different number of strokes being assigned to the symbol in the symbol-relation pair and selecting a best path score from the plurality of path scores;
    using the path scores to construct a symbol graph comprising nodes connected by path segments, each path segment having a path segment score that is based in part on a path score and representing at least a symbol-relation pair;
    using the symbol graph to identify a recognized mathematical expression that represent the handwritten equation; and
    storing the recognized mathematical expression.

2. The method of claim 1 wherein forming path scores comprises forming path scores based in part on a duration model probability that provides the probability of a number of strokes being assigned to a symbol given the symbol.

3. The method of claim 2 wherein forming the path scores further comprises forming the path scores based in part on a spatial relation model probability that provides the probability of a spatial relation between first and second symbols given a spatial relation between the second symbol and a third symbol.

4. The method of claim 1 wherein forming a path segment score based in part on a path score comprises forming a path segment score based on a path score that ends at the symbol-relation pair and based on a path score that ends at the predecessor symbol-relation pair.

5. The method of claim 1 wherein each path segment further represents a stroke index representing the last stroke assigned to the symbol in the symbol-relation pair.

6. The method of claim 1 wherein using path scores to construct a symbol graph comprises adding nodes and path segments to the graph while backtracking through path scores from the last stroke in the received strokes to the first stroke in the received strokes.

7. A computer storage medium having computer-executable instructions for performing steps comprising:
    accessing data representing a sequence of strokes in a handwritten equation;
    performing a forward pass through the sequence of strokes from the first stroke in the sequence to the last stroke in the sequence, the forward pass comprising at each stroke, determining a path score for a plurality of symbol-relation pairs that each represents a symbol and its spatial relation to a predecessor symbol;
    constructing a symbol graph comprising nodes and links by backtracking through the strokes from the last stroke to the first stroke and assigning scores to the links based on the path scores for the symbol-relation pairs, wherein assigning scores to the links comprises determining a score for the link based on a path score for a symbol-relation pair and a separate path score for a predecessor symbol-relation pair;
    using the symbol graph to recognize a mathematical expression based in part on the scores for the links; and
    storing the mathematical expression.

8. The computer storage medium of claim 7 further comprising providing the mathematical expression to a user, receiving a modification to the mathematical expression, using the modification to alter the symbol graph to form an altered symbol graph, using the altered symbol graph to recognize a new mathematical expression, and storing the new mathematical expression.

9. The computer storage medium of claim 8 wherein the new mathematical expression comprises at least one symbol-relation pair that was not found in the mathematical expression and was not found in the modification to the mathematical expression.

10. The computer storage medium of claim 7 wherein determining a path score comprises determining a path score that is associated with a symbol-relation pair, a predecessor symbol-relation pair and a stroke.

11. The computer storage medium of claim 10 wherein determining a path score comprises determining a plurality of path scores for a symbol-relation pair, a predecessor symbol-relation pair and a stroke, each path score being associated with a different number of strokes being assigned to the symbol in the symbol-relation pair and selecting one of the plurality of path scores to thereby select a number of strokes assigned to the symbol.

12. The computer storage medium of claim 11 wherein backtracking comprises placing a node in the graph for a predecessor symbol-relation pair based on a path score associated with a symbol-relation pair, the predecessor symbol-relation pair and a stroke, the node being placed at a stroke based on the number of strokes assigned to the symbol in the symbol-relation pair when computing the path score.

13. A method comprising:
accessing data representing strokes of a handwritten equation;
for each stroke, a processing unit determining a set of scores for each of a plurality of combinations of symbol-relation pairs, previous symbol-relation pairs, and stroke where a symbol-relation pair comprises a symbol and a spatial relation between the symbol and a previous symbol, each score in a set of scores being associated with a different number of strokes being assigned to the symbol in the symbol-relation pair;
for each combination of stroke, symbol-relation pair, and previous symbol-relation pair, selecting one of the set of scores for that combination and thereby identifying a grouping of strokes for the symbol in the symbol-relation pair;
storing the grouping and the score; and
using the grouping and the score to construct a symbol graph by forming a node for the symbol-relation pair and a node for the previous symbol-relation pair, forming a link between the nodes, and determining a score for the link based in part on the selected path score.

14. The method of claim 13 wherein determining a score comprises determining a score based in part on a duration model probability that provides the probability of a number of strokes being assigned to a symbol given the symbol.

15. The method of claim 13 wherein determining a score comprises determining a score based in part on a spatial structure probability that provides the probability of a spatial relation between a first symbol and a second symbol given a spatial relation between the second symbol and a third symbol.

16. The method of claim 13 further comprising using the graph to identify a recognized mathematical expression and storing the recognized mathematical expression.

* * * * *